United States Patent
Reckziegel et al.

(10) Patent No.: US 10,625,743 B2
(45) Date of Patent: Apr. 21, 2020

(54) METHOD FOR ASCERTAINING DATA OF A TRAFFIC SITUATION

(71) Applicant: Robert Bosch GmbH, Stuttgart (DE)

(72) Inventors: Bastian Reckziegel, Krichhein/Nabern (DE); Erich Sonntag, Marbach am Neckar (DE); Gian Antonio D' Addetta, Stuttgart (DE); Johannes Foltin, Ditzingen (DE); Sybille Eisele, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 15/800,384

(22) Filed: Nov. 1, 2017

(65) Prior Publication Data

US 2018/0148061 A1    May 31, 2018

(30) Foreign Application Priority Data

Nov. 28, 2016   (DE) .................. 10 2016 223 579

(51) Int. Cl.
| | |
|---|---|
| *B60W 30/18* | (2012.01) |
| *G06K 9/00* | (2006.01) |
| *B60W 50/14* | (2020.01) |
| *B60W 30/095* | (2012.01) |
| *B60W 40/04* | (2006.01) |
| *B60W 40/105* | (2012.01) |
| *B60W 40/107* | (2012.01) |

(52) U.S. Cl.
CPC .. *B60W 30/18163* (2013.01); *B60W 30/0956* (2013.01); *B60W 40/04* (2013.01); *B60W 40/105* (2013.01); *B60W 40/107* (2013.01); *B60W 50/14* (2013.01); *G06K 9/00791* (2013.01); *G06K 9/00805* (2013.01); *B60W 2050/143* (2013.01); *B60W 2050/146* (2013.01); *B60W 2550/30* (2013.01); *B60W 2550/308* (2013.01); *B60W 2550/402* (2013.01); *B60W 2550/408* (2013.01)

(58) Field of Classification Search
CPC ....... B60W 30/18163; B60W 30/0956; B60W 40/04; B60W 40/105
See application file for complete search history.

(56) References Cited

U.S. PATENT DOCUMENTS

| | | | | |
|---|---|---|---|---|
| 2016/0242223 A1* | 8/2016 | Brahmi | ............... | H04W 28/021 |
| 2017/0101102 A1* | 4/2017 | Matei | .............. | B60W 30/18163 |

FOREIGN PATENT DOCUMENTS

| | | |
|---|---|---|
| DE | 102012005245 A1 | 9/2012 |
| DE | 102011086299 A1 | 5/2013 |
| EP | 2 837 538 A1 | 2/2015 |
| WO | 2015/096878 A1 | 7/2015 |

* cited by examiner

*Primary Examiner* — Michael D Lang
(74) *Attorney, Agent, or Firm* — Norton Rose Fulbright US LLP; Gerard Messina (57) ABSTRACT

A method for ascertaining data of a traffic situation with a first vehicle and at least one second vehicle trailing the first vehicle, the method including a) ascertaining at least one defined parameter of the first vehicle, b) ascertaining a traffic situation in front of the first vehicle by the first vehicle and/or by the second vehicle, c) evaluating the information ascertained in steps a) and b) in a defined manner, and providing the information evaluated in step c) to the second vehicle at least at the start of a passing maneuver of the first vehicle conducted by the second vehicle.

18 Claims, 4 Drawing Sheets

METHOD FOR ASCERTAINING DATA OF A TRAFFIC SITUATION

CROSS REFERENCE

The present application claims the benefit under 35 U.S.C. § 119 of German Patent Application No. DE 102016223579.6 filed on Nov. 28, 2016, which is expressly incorporated herein by reference in its entirety.

FIELD

The present invention relates to a method for ascertaining data of a traffic situation. In addition, the present invention relates to a device for ascertaining data of a traffic situation.

BACKGROUND INFORMATION

Conventional systems are available that display an image of a forwardly pointing camera on a back side of a truck. This allows trailing traffic to monitor the traffic situation in front of the truck. Dangerous passing maneuvers are able to be prevented in this manner.

In addition, assistance systems (such as passing assistants) are conventional in the automotive sector, which warn a driver when he is initiating a passing maneuver but another overtaking vehicle is approaching from the rear.

Assistance systems that estimate a range of vision of an environmental sensor on the basis of navigation maps and environmental sensor data and adjust their behavior in response are likewise known in the automotive sector. An estimated range of vision may be used for other assistance systems as well.

Moreover, assistance systems that warn the driver of approaching a curve at an excessive speed are also known in the automotive field.

In addition, an environmental sensor system that is able to measure a distance as well as a relative movement (velocity, acceleration, etc.) of the own (host) vehicle in relation to another object (such as a driver traveling ahead, approaching traffic, etc.) is conventional in the automotive field.

German Patent Application No. DE 10 2011 086 299 A1 describes a method and a corresponding driver information system for informing the driver of a vehicle about the feasibility of a passing maneuver. Taken into account in this case is sensor information that was ascertained in the course of the passing maneuver with the aid of an environmental sensor system (e.g., ultrasonic sensors, side-view cameras); this the sensor information is recorded by the overtaken vehicle after the passing vehicle has pulled into the adjacent lane, in particular while the overtaken vehicle is being passed along the side. The information about the feasibility of the passing maneuver is determined as a function of said sensor information.

PCT Application No. WO 2015/096 878 A1 describes a method for providing driver assistance for a vehicle. Here, an area in the environment of a first vehicle is monitored, and the state of a road in the environment of the first vehicle is determined, the road state meeting defined risk criteria. A second vehicle, which initiates a passing maneuver in order to pass the first vehicle, is identified in the process, and a collision risk for the first and/or the second vehicle is ascertained during the passing maneuver.

PCT Application No. DE 10 2012 005 245 A1 describes a method for assisting a driver of a motor vehicle during a passing maneuver in a traffic lane that runs in the opposite direction but may be used for a passing operation. In this instance, it is ascertained whether the actually two-lane road may also be used as a three-lane road for passing purposes. This is ascertained with the aid of a gap, and the passing maneuver may take place exactly at the point where the gap exceeds a width of the motor vehicle, so that the vehicle is able to drive inside the gap while executing the passing maneuver, i.e., the vehicle is able to pass the object notwithstanding the oncoming traffic object.

European Patent No. EP 2 837 538 A1 describes a safety system for a motor vehicle, which provides useful information during a passing maneuver of another motor vehicle.

People have difficulties in estimating distances and movements far ahead since they are unable to see in three dimensions starting at a distance of roughly 30 to 50 meters, and instead estimate distances in a model-based manner. However, the model-based distance and movement estimation is heavily tainted with error and in automotive traffic may have fatal consequences during passing maneuvers that involve oncoming traffic. Regardless thereof, a visibility of the road is frequently overestimated while the adverse effect of crests, junctions or curves etc. is underestimated.

In addition to incorrect estimates of the distance and relative velocity, the underestimating of the length of the vehicle to be passed as well as the overestimating of the performance capability of one's own vehicle (e.g., acceleration values, maximum speed etc.) may only make the problem worse. For even if a passing maneuver is successful, it is possible that the passing vehicle has a residual speed at the conclusion of the passing maneuver that is too high for passing safely through the following curve.

SUMMARY

It is an object of the present invention to provide an improved method for ascertaining data pertaining to a traffic situation.

According to a first aspect, the objective may be achieved by proving an example method in accordance with the present invention for ascertaining data of a traffic situation using a first vehicle and at least one second vehicle trailing the first vehicle, the method having the following steps:

a) Ascertaining at least one defined parameter of the first vehicle;
b) Ascertaining a traffic situation in front of the first vehicle using the first vehicle and/or the second vehicle;
c) Evaluating the information ascertained in steps a) and b) in a defined manner; and
d) Providing the information evaluated in step c) to the second vehicle at least at the start of a passing maneuver of the first vehicle executed by the second vehicle.

Using the supplied data, the driver of the second vehicle is advantageously able to estimate and carry out his passing maneuver in a more optimal manner. Due to the fact that restricted traffic situations are frequently encountered in the oncoming traffic lane, the method is suitable for the safe execution of passing maneuvers especially in environments where heavy traffic is encountered.

According to a second aspect of the present invention, the objective may be achieved by providing an example device for ascertaining data of a traffic situation using a first vehicle and at least one second vehicle trailing the first vehicle, the device including:

An acquisition device for acquiring at least one defined parameter of the first vehicle and a traffic situation in an oncoming lane;
An evaluation device for evaluating the acquired data; and An output device for outputting the evaluated data in the second vehicle.

Advantageous further developments of the present method are described herein.

One advantageous further development of the present method is characterized by the fact that a relative velocity of the first vehicle with respect to the second vehicle is ascertained in step a). In this way a passing maneuver is able to be planned and carried out in an even more optimal manner.

Additional advantageous further developments of the present method are characterized by the fact that in step a), a length of the first vehicle is ascertained by the second vehicle, or the length of the first vehicle is transmitted from the first vehicle to the second vehicle. This advantageously makes it possible to provide the vehicle that is conducting the passing maneuver with important information regarding the length of a passing distance and to accomplish this in a variety of ways.

Another advantageous further development of the method is characterized by the fact that in step b), the second vehicle ascertains a relative speed of a third vehicle traveling in an oncoming lane with respect to the second vehicle. This advantageously makes it possible to also take circumstances of oncoming traffic into account in the passing maneuver.

Another advantageous further development of the present method is characterized by the fact that an acceleration behavior of the second vehicle is used for the defined evaluation of the information ascertained in steps a) and b). These data, for example, may be ascertained from statistical evaluations that analyze a driving behavior of the driver, and may be used to plan and execute the passing maneuver in an even more optimal manner.

Another advantageous further development of the present invention provides that in step d), a target speed is output at which the second vehicle will currently have to be driven in order to pass the at least one vehicle driving ahead. This allows the driver of the second vehicle to rapidly determine whether his initiated passing maneuver is able to be safely continued and concluded, or whether it has to be aborted ahead of time.

Another advantageous further development of the present method is characterized by the fact that in step b), the traffic situation in the oncoming lane is ascertained at least partially by the first vehicle. Additional data are thereby supplied by the vehicle traveling ahead and made available to the trailing vehicle. This advantageously makes it possible to detect and analyze a traffic situation in an even more optimal manner.

Additional advantageous further developments of the present method are characterized by the fact that the data ascertained by the first vehicle and/or the third vehicle are transmitted directly to the second vehicle in a wireless manner, or are transmitted to the second vehicle with the aid of an infrastructure device. A wide variety of options for transmitting information to the second vehicle are realizable in this manner and thus allow for an efficient utilization of resources for acquiring the traffic situation. For example, defined parameters of the traffic situation and/or a setpoint minimum passing speed are able to be transmitted to the second vehicle in this manner.

A characteristic of another advantageous further development of the present method is that the data ascertained by the third vehicle are transmitted wirelessly to the second vehicle. This allows for an efficient exploitation of resources for detecting the traffic situation.

Another advantageous further development of the present method is characterized by the fact that in step b), data from a digital map are used for ascertaining the traffic situation. For example, this makes it possible to use specific circumstances of the road layout such as, specifically, tight curve radii, narrow stretches, inclines etc. for ascertaining the data regarding the traffic situation.

Another advantageous further development of the present method provides that the data pertaining to the traffic situation and/or the at least one defined parameter are output in an optical and/or acoustic manner in the second vehicle. This makes it possible to inform a driver of the second vehicle of, for example, a minimum speed and/or a delta speed for reaching a minimum passing speed. For instance, this may be implemented in an advantageous manner with the aid of a symbol in an instrument cluster of the vehicle, said symbol being usable as a recommendation for a qualitative behavior, for instance.

Another advantageous further development of the present invention is characterized by the fact that the data regarding the traffic situation are made available to an assistance system of the second vehicle. In an advantageous manner, the data are thereby able to be used for a speed control or other assistance systems of the vehicle, for example.

Below, the present invention is described in detail with further features and advantages on the basis of a plurality of figures. Identical or functionally equivalent elements have been provided with the same reference numerals. For better clarity, not all of the reference numerals may be shown in all of the figures.

Disclosed method features result analogously from corresponding disclosed device features, and vice versa. This particularly means that features, technical advantages and embodiments in connection with the method result in a similar manner from corresponding features, technical advantages and embodiments regarding the device, and vice versa.

DETAILED DESCRIPTION OF EXAMPLE EMBODIMENTS

Figure 1:
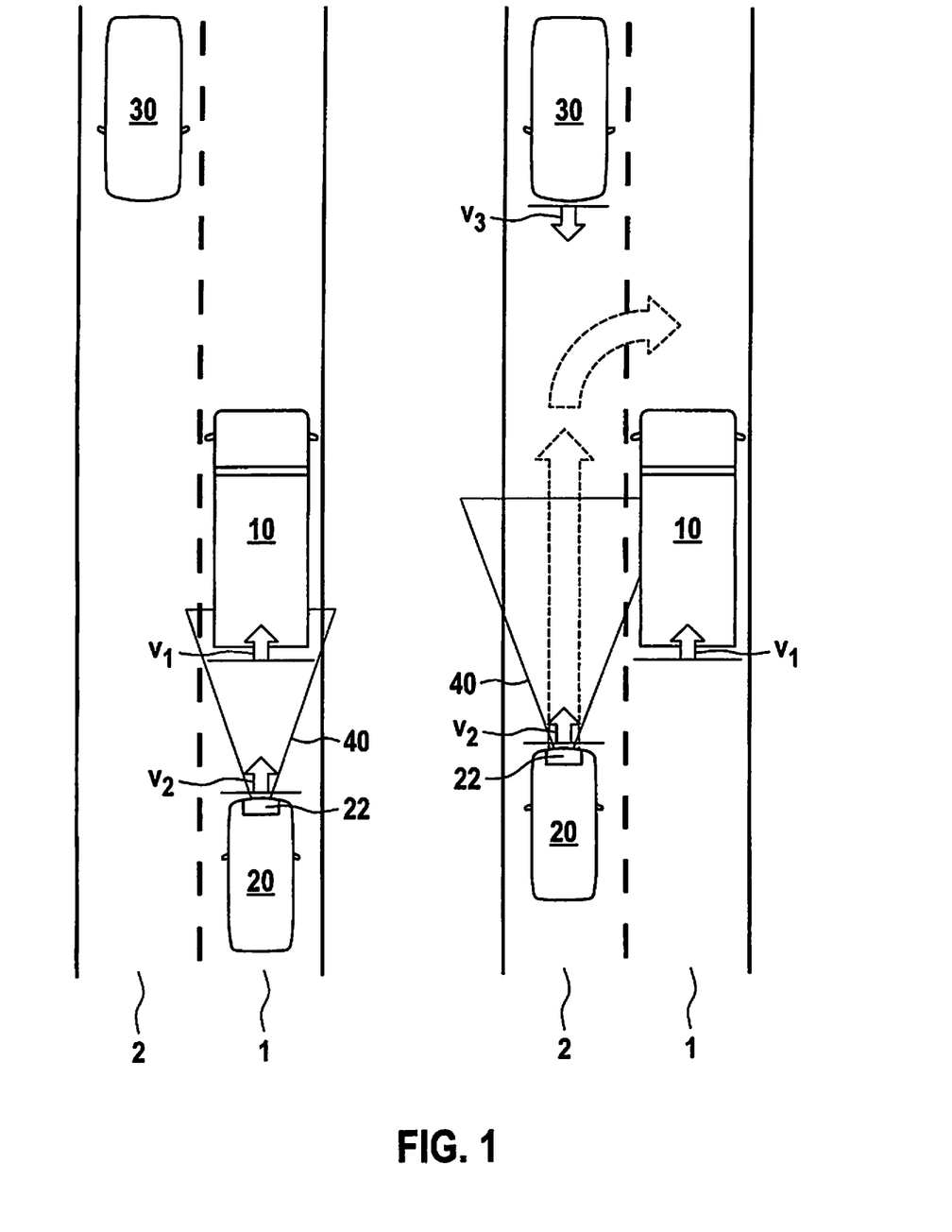
FIG. 1 shows a basic representation of a method of functioning of a specific embodiment of the provided method.

FIG. 1 shows a scenario for explaining a method of functioning of the method according to the present invention, the figure naturally being able to suggest only a snapshot of a specific traffic situation. To be seen is a first vehicle 10 (such as a truck), which is driving in a traffic lane 1 in front of a second vehicle 20; also depicted is a third vehicle 30, which is approaching in an oncoming lane. Using a sensor device 22 (e.g., radar, lidar, camera, ultrasound, etc.) disposed in second vehicle 20, an area 40 in the environment of second vehicle 20 is able to be sensed.

In the left illustration, FIG. 1 shows that second vehicle 20 is located behind first vehicle 10. Using sensor device 22, second vehicle 20 is able to ascertain a distance as well as the speed of first vehicle 10, i.e. the relative speed of first vehicle 10 with regard to second vehicle 20. Speed $v_2$ of second vehicle 20 is indicated by an arrow. Oncoming vehicle 30, which is traveling at a speed $v_3$, is not yet visible to sensor device 22 and is therefore unknown to the system.

After second vehicle 20 has moved to pass first vehicle 10, as sketched in the right illustration of FIG. 1, sensor device 22 of second vehicle 20 is able to measure the length of first vehicle 10 and also to ascertain a distance to third vehicle 30, and a relative speed of second vehicle 20 with regard to third vehicle 30.

Using own (host) speed $v_2$, speed $v_1$ of first vehicle 10, the length of second vehicle 20, as well as the distance and relative speed of oncoming third vehicle 30, an evaluation device (50) of second vehicle 20 is able to ascertain a minimum speed ("minimum passing speed") required by second vehicle 20 for executing the passing maneuver of first vehicle 10. The passing maneuver is indicated by a broad dashed arrow on the side and in front of first vehicle 10.

Depending on the specific embodiment, the acceleration of second vehicle 20 as well as the reaction time of the driver are able to be taken into account when ascertaining the minimum speed (the slower the acceleration, the higher the target/minimum speed must be, and the longer the reaction time, the higher the target/minimum speed).

Depending on the specific embodiment, it is possible to provide the minimum speed, a delta for reaching the minimum speed, as well as symbolic information to the driver of second vehicle 20 in a display or instrument cluster, in acoustic voice messages etc., or to recommend that the passing maneuver be aborted, for example.

Instead of or in addition to an optical/acoustic output of the ascertained information, the present method is also able to transmit said data to at least one assistance system (not shown) of second vehicle 20, for instance in order to adjust a target speed of second vehicle 20 automatically or in order to start an evasive maneuver or to abort the passing operation.

First vehicles 10, which are particularly long because of trailers, for example, are able to be identified as overlong vehicles by analyzing a red reflector on the trailer, which is taken into account when ascertaining the minimum passing speed. In the case of very long vehicles without trailer, this information is able to be transmitted via a car-to-car communication, for instance. The transmission of the information from vehicle to vehicle is basically an option for any vehicle, e.g., also for vehicles with trailers and for vehicles having a random length.

The ascertainment of the necessary passing/target speed is preferably developed as an adaptive ascertainment, meaning that the aforementioned ascertaining operations are able to be carried out continuously or at preferably regular intervals Δt, the display and forwarding of the corresponding data to the driver of second vehicle 20 being adapted accordingly. In addition, based on a gradient of sequential measurements, it is possible to estimate whether the passing maneuver must be aborted if oncoming third vehicle 30 increases its driving speed.

The same also applies if oncoming third vehicle 30 clearly reduces its speed, which is detectable with the aid of a gradient. This leads to the conclusion that oncoming third vehicle 30 recognizes the situation as a danger.

The previously mentioned and explained functionality of the method according to the present invention may be further improved if data are exchanged between vehicles 10, 20 and 30, but at least between first vehicle 10 and second vehicle 20. For example, first vehicle 10 to be passed is able to detect its own length as well as a traffic situation in road section 1, 2 lying ahead, and report it. This makes it possible to supply information regarding the minimum passing speed to the driver of second vehicle 20 even before he pulls out of his lane for the passing maneuver. For example, similar to the swing-out assistant, the minimum passing speed could be indicated to the driver of second vehicle 20 upon activation of the turn signal indicator.

Figure 2:
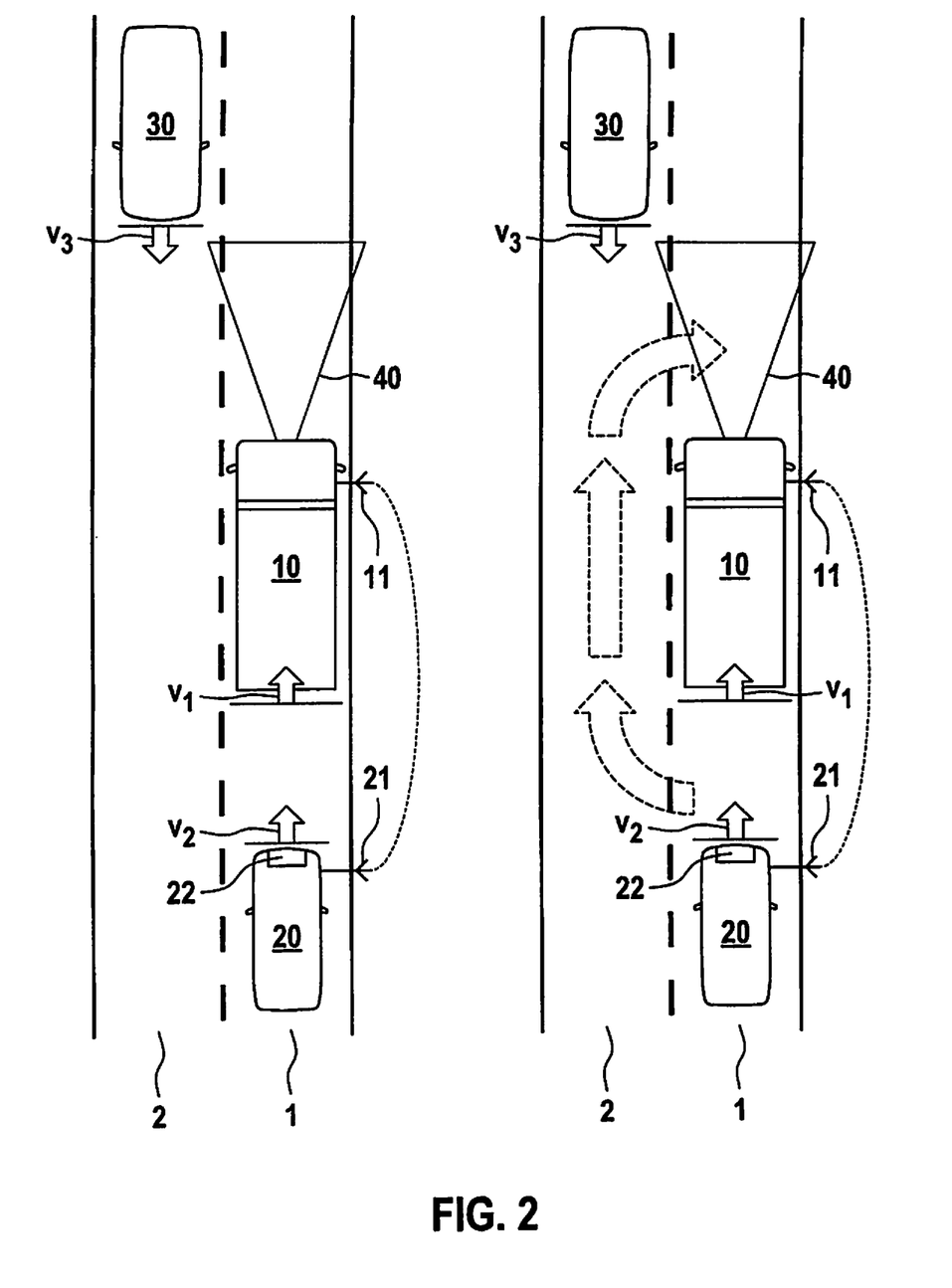
FIG. 2 shows a basic representation of a method of functioning of a further specific embodiment of the provided method.

FIG. 2 shows the scene from FIG. 1. In this case, second vehicle 20 is connected to first vehicle 10 by a wireless communications link via antennas 21, 11 (e.g., using an ad-hoc network or indirectly via an infrastructure device, which is not shown). Second vehicle 20 is aware only of its own speed in the left illustration of FIG. 2. First vehicle 10 is equipped with an environmental sensor system (e.g., in the form of cameras for a lane-departure warning assistance system), which are able to identify other road users, for example. It can be seen quite clearly that first vehicle 10 is also able to sense an area 40 of road section 1, 2 lying ahead in this case, the corresponding data being transmitted to trailing second vehicle 20. In this way, first vehicle 10 knows its own speed as well as the distance and relative speed of oncoming third vehicle 30. Furthermore, the own length is known to first vehicle 10, and, for example, the presence of a trailer.

For instance, it may also be the case that a relative speed between oncoming third vehicle 30 and first vehicle 10 is ascertained. Here, a relative speed between second vehicle 20 ("passing vehicle") and third vehicle 30 ("oncoming vehicle") is ascertained by ascertaining a relative speed between first vehicle 10 and second vehicle 20 and by ascertaining the relative speed between first vehicle 10 and oncoming third vehicle 30.

The distance between first vehicle 10 and second vehicle 20, for example, is able to be ascertained by second vehicle 20 with the aid of sensor device 22, or be ascertained from a precise localization/position of second vehicle 20 and first vehicle 10. It may also be measured by first vehicle 10 in the backward direction and transmitted via the mentioned wireless communications link.

The relevant data are transmitted from first vehicle 10 to second vehicle 20 via said communications link, thereby enabling second vehicle 20 to estimate the passing maneuver and/or to ascertain the required minimum speed for passing first vehicle 10. The utilization of car-to-x has the advantage that second vehicle 20 requires a lower number of sensors for sensor device 22.

In addition to the mentioned communication with first vehicle 10 driving ahead, it may also be provided that a communication takes place with a surrounding infrastructure in order to thereby obtain information indirectly, e.g., via an evaluation of a traffic monitoring camera (not shown).

In one further specific embodiment, which is likewise not illustrated in the figures, first vehicle 10 and/or third vehicle 30 transmit(s) the minimally required passing speed to second vehicle 20, as a result of which data for a data transmission are advantageously reduced. After second vehicle 20 has pulled out of the lane, second vehicle 20 is then able to check the minimum passing speed, for instance with the aid of onboard environmental sensors.

In principle, an alignment of the minimum passing speed and a permitted maximum speed is able to take place along the road section. The permitted maximum speed may either be determined from map data or also with the aid of sensors (e.g., using video, sign recognition, etc.). As an alternative, it is also possible to utilize a car-to-car report of first vehicle 10 driving in front for this purpose. In the same way, an alignment with a passing prohibition in an examined road section may take place. If such a prohibition is encountered, then a corresponding item of information and a corresponding warning are output. In a further alternative, in which second vehicle 20 has a steering motor control, passing of first vehicle 10 is prevented by an automatic driving intervention.

In addition to the display of a minimum passing speed, it is also possible to indicate to the driver of second vehicle 20 that a passing maneuver is not possible. For instance, this can be done quite easily when the minimum passing speed exceeds a threshold, or when oncoming third vehicle 30 is already located next to first vehicle 10 to be passed. This warning may also advantageously take place during a connection (e.g., using car-to-car) with a vehicle that is driving ahead and is impossible to estimate, e.g., a truck.

In the situation from FIG. 2 on the left, it is possible, by way of example, to indicate a minimum passing speed starting from which passing of first vehicle 10 by second vehicle 20 is able to be carried out in a safe manner.

In another advantageous specific embodiment, instead of an oncoming third vehicle 30, another specific traffic situation in traffic lane 1 and/or oncoming lane 2, such as a toppled tree, boulder, flooded region, pedestrians, animals, etc., is/are detected that may be called an actual cause of danger, and these data are made available to second vehicle 20. The driver of second vehicle 20 is then able to react accordingly. In other, less frequently occurring cases, the driver is then also able to decide whether to carry out the passing maneuver for passing first vehicle 10 or whether to perhaps abort it instead.

In another specific embodiment of the present method, instead of an actually existing dangerous location (e.g., a construction site, an accident situation, poor road quality due to precipitation, etc.), a possible or potential danger spot is analyzed. For example, a sight obstruction by roadside structures, shrubbery, etc. in a curve region and/or difficult to see ridges and/or intersections may be possible danger spots.

No danger as such emanates from these possible or potential danger spots, but depending on the specific traffic situation, which may not necessarily be detectable by the environmental sensor system, a specific dangerous situation may develop here. For example, a curve with no line of sight may be a potential danger source because an actual danger source may be created there when a vehicle suddenly appears in the curve. Taking the potential danger source into account makes it possible to assist the driver in the safe and correctly timed passing maneuver.

A passing prohibition, which is able to be provided by a navigation system, for example, may likewise be treated as a possible danger source. No-passing signs are frequently placed in areas where actual danger situations caused by passing maneuvers may arise more frequently.

The possible danger spot, for example, may lie at the margin of the visual range, or it may also lie closer in the direction of second vehicle 20 because oncoming third vehicles 30 that suddenly enter the visual range shorten the available reaction distance on account of the own movement. For example, the possible danger spot may be placed at the margin of the visual range while taking a speed of an oncoming vehicle into account, for example at the level of a constant model speed, ego-vehicle speed, configuration speed of the road, the maximally permitted speed (possibly with an offset), and/or a mixture of said speeds.

The restriction by a possible danger source may be signaled to the driver in a different manner than in the case of an actual danger spot (such as a different color of the display: yellow instead of red, other warning/symbol, etc.).

Another type of approach for managing these danger spots is an adaptation of certain thresholds, e.g., appropriately adapting the threshold for the speed in the presence of a higher number of junctions detected using GPS, local maps, etc. In one specific embodiment, the passing speed is restricted toward the maximum in order not to let a possible relative speed of merging vehicles become excessive. In another specific embodiment, a minimum passing speed is specified in order to rapidly conclude the passing maneuver. The threshold may pertain to a speed, but also to a maximum passing time, etc.

In another specific embodiment, the system takes the final speed of the passing maneuver and the geometry at the end of the passing maneuver into account when calculating the maximum speed (and also in the recommendation to abort the passing maneuver). If the final speed of the passing maneuver is very high and the speed is higher than permitted by the road geometry/infrastructure, then the system recommends not to carry out the passing maneuver.

A relative road geometry may be a curve that cannot be negotiated at the final speed of second vehicle 20, thus making it impossible for the driver to brake adequately and in a timely manner. In addition, a relevant infrastructure, for example, may be an active traffic light that switches to red. Further infrastructure devices may be speed limits, e.g., direct speed limits (such as traffic signs), or indirect limits (such as city limits).

In one further specific embodiment, when calculating the maximum speed, the system takes into account the final speed of the passing maneuver and the speed of a fourth vehicle (not shown), which is driving in front of first vehicle 10 and behind which second vehicle 20 would reenter the lane. If the final speed of the passing maneuver lies considerably above the speed of the fourth vehicle and a heavy braking operation would therefore be required in order to avoid a collision, then the system recommends not to go ahead with the passing maneuver. The specific embodiment is similar to the preceding specific embodiment for considering the relevant road geometry. The fourth preceding vehicle, behind which a return to the lane is to take place, specifies the maximum target speed.

In another specific embodiment, oncoming third vehicle 30 transmits data directly to passing second vehicle 20 (e.g. by car-to-car, ad-hoc network, etc.). In this case, the data may be plausibilized using data from own measurements of second vehicle 20. However, this should then be preceded by an unequivocal identification as to the target vehicle in a passing maneuver. In addition or as an alternative, an identification of individual or all vehicles involved in the passing maneuver is advantageous in order to exclude an incorrect allocation of a passing speed. A corresponding identification may be carried out based on gradients and environmental information, for instance.

By way of example, oncoming third vehicle 30 may also transmit a minimum passing speed to passing second vehicle 20 for passing first vehicle 10 based on the evaluation of its own data.

Ideally, the report that a passing vehicle 20 in a passing maneuver is located in front of third vehicle 30 is received by oncoming third vehicle 30 as well. In addition, a reference in the display and a warning may be carried out, or in an emergency, an emergency braking maneuver.

In another specific embodiment, when estimating the possible trajectory during the return to the lane, a coefficient of friction of the road is estimated, e.g. by first vehicle 10, second vehicle 20, third vehicle 30, or by the surrounding infrastructure, or from a coefficient of friction map, which is transmitted via car-to-x, for example. At a low coefficient of friction of the road, the curves that can be negotiated are less tight than when traveling on roads featuring a high coefficient of friction.

Figure 3:
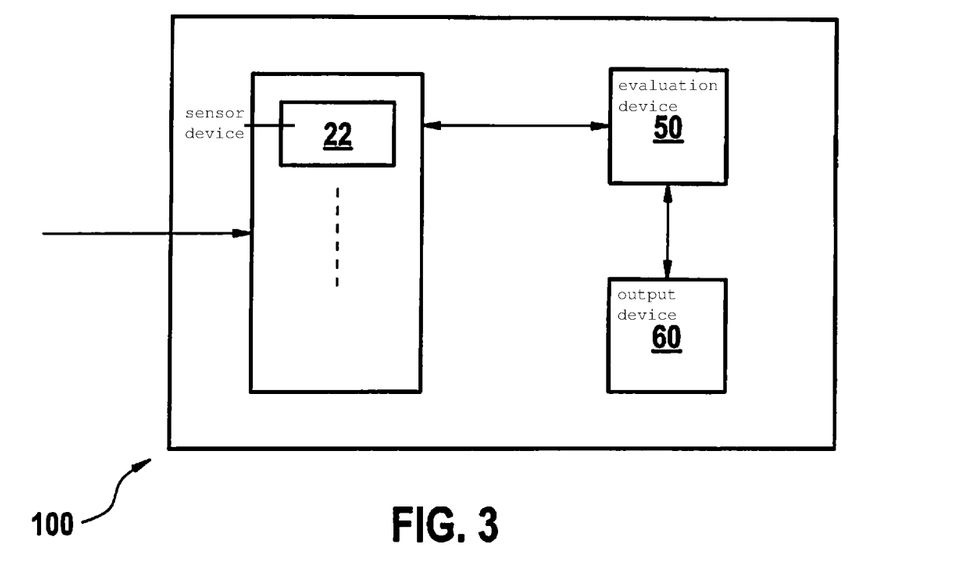
FIG. 3 shows a basic block circuit diagram of a specific embodiment of the provided method.

FIG. 3 shows a simplified block circuit diagram of a device 100 for ascertaining data of a traffic situation using a first vehicle 10 and at least one second vehicle 20 trailing first vehicle 10. To be seen is a sensor device 22 of second vehicle 20, which is functionally connected to an evaluation device 50. Evaluation device 50 evaluates the acquired data and forwards the evaluated data to an output device 60, by which the data are made available to second vehicle 20.

Figure 4:
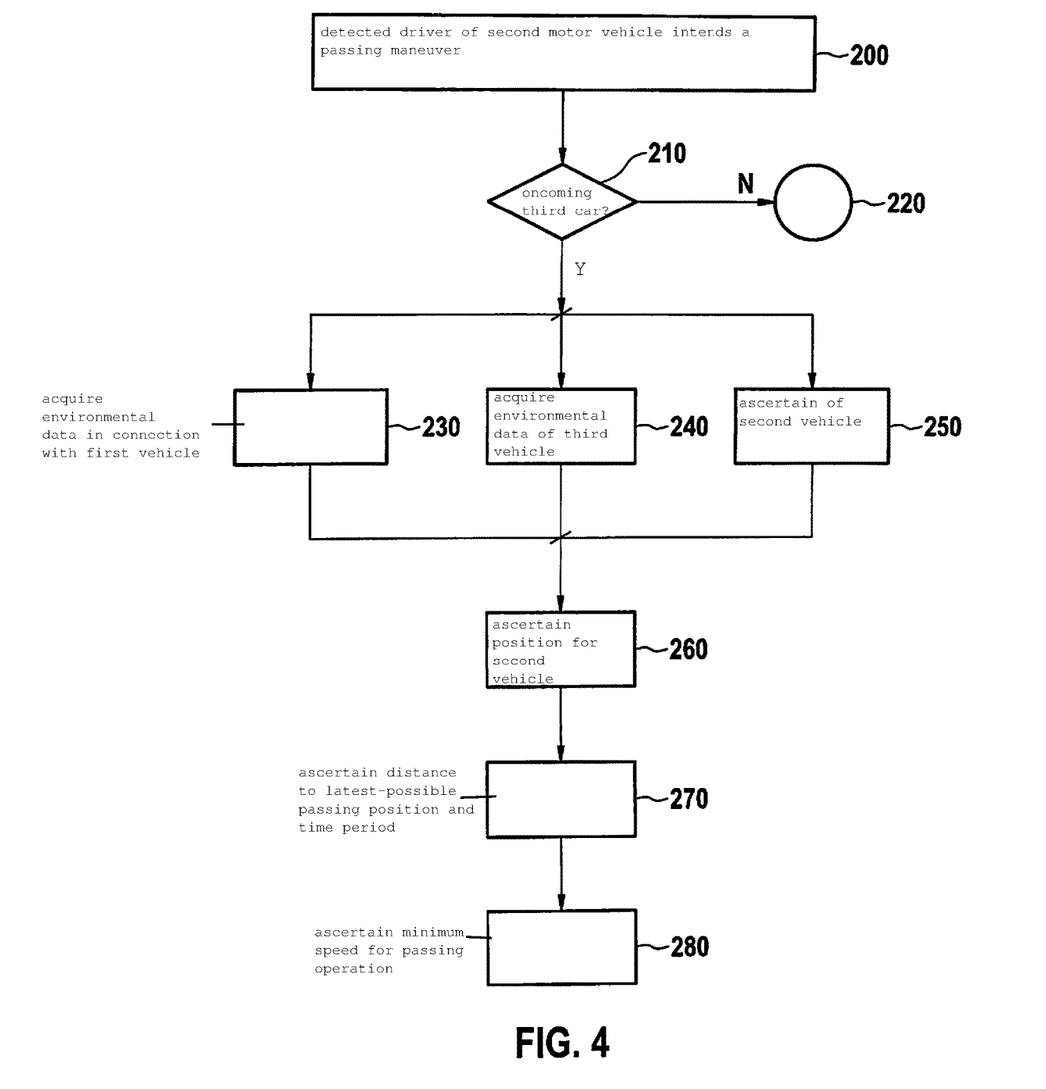
FIG. 4 shows an exemplary sequence of the provided method featuring a plurality of options.

FIG. 4 shows a sequence of a merely exemplary sequence of the provided method including multiple, solely exemplary options. In a step 200, it is detected that a driver of second motor vehicle 20 is intent on a passing maneuver, e.g., by an operation of the turn signal indicator of second vehicle 20 and by a first vehicle 10 driving ahead at a slower speed.

In a step 210, it is checked whether an oncoming third vehicle 30 is present. If this is not the case, branching to step 220 takes place.

If it was detected in step 210 that an oncoming third vehicle is present, environmental data in connection with first vehicle 10 traveling ahead are acquired in a step 230, e.g., a distance to first vehicle 10, and/or a speed, and/or a length of first vehicle 10, etc. As an alternative, environmental data regarding oncoming third vehicle 30 are acquired in a step 240, such as a distance to third vehicle 30, and/or a speed of third vehicle 30, etc.

As an alternative, own data of second vehicle 20 are ascertained in a step 250, such as a speed, and/or a geometry (e.g., length, wheelbase, etc.) of second vehicle 20.

In a step 260, the environmental data regarding first vehicle 10 driving ahead (e.g., speed, and/or position, etc.) and the environmental data regarding oncoming third vehicle 30 (e.g., speed, and/or vehicle tip, etc.) are used to ascertain the particular position for second vehicle 20 at which the latest return to the own traffic lane is possible in a passing operation (preferably taking the vehicle length and/or speed, and/or the steerability, etc. of second vehicle 20 into account).

In a step 270, an ascertained distance to a "latest-possible passing position" and a time period until first vehicle 10 driving ahead and oncoming third vehicle 30 have reached the respective latest-possible passing positions, is utilized to ascertain how much time still remains for second vehicle 20 to pass first vehicle 10.

In a step 280, the minimum speed for the passing operation is ascertained from the distance between the first and second vehicle 10, 20, and the time, and transmitted to second vehicle 20.

Figure 5:
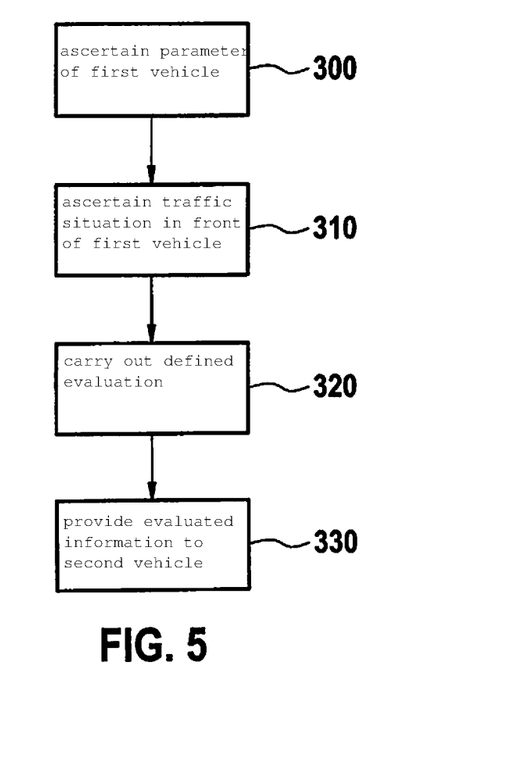
FIG. 5 shows a basic flow diagram of a specific embodiment of the provided method.

FIG. 5 shows a basic sequence of a specific embodiment of the method according to the present invention.

In a step 300, at least one defined parameter of first vehicle 10 is ascertained.

In a step 310, a traffic situation in front of first vehicle 10 is ascertained by first vehicle 10 and/or by second vehicle 20.

In a step 320, a defined evaluation of the information ascertained in steps a) and b) is carried out.

In a step 330, the information evaluated in step c) is provided to second vehicle 20 at least at the start of a passing maneuver of first vehicle 10 by second vehicle 20.

One skilled in the art will modify the features of the present invention in a suitable manner and/or combine them with one another without departing from the core of the present invention.

What is claimed is:

1. A method for ascertaining data of a traffic situation using a first vehicle and at least one second vehicle trailing the first vehicle, the method comprising:
   a) receiving, from a first vehicle traveling in a first traffic lane, via a wireless communication network, by a second vehicle, a length of the first vehicle, the second vehicle traveling in the first traffic lane and trailing the first vehicle in the first traffic lane;
   b) ascertaining a traffic situation in front of the first vehicle by the first vehicle and/or the second vehicle;
   c) evaluating, by the second vehicle, the received length of the first vehicle received in step a) and the ascertained traffic situation ascertained in step b), the evaluating including determining, using the received length and the ascertained traffic situation, a minimum passing speed for the second vehicle to pass the first vehicle; and
   d) providing the determined minimum passing speed determined in step c) to the second vehicle at least at the start of a passing maneuver of the first vehicle conducted by the second vehicle.

2. The method as recited in claim 1, further comprising: ascertaining a relative speed of the first vehicle with respect to the second vehicle, and the evaluating in step c) including evaluating the ascertained relative speed.

3. The method as recited in claim 1, wherein in step b), at least one of a relative speed of a third vehicle and a distance of the third vehicle, traveling in an oncoming traffic lane, with respect to the second vehicle is ascertained by the second vehicle.

4. The method as recited in claim 1, wherein an acceleration behavior of the second vehicle is used for the evaluating of the received length of the first vehicle received in step a) and the traffic situating ascertained in step b).

5. The method as recited in claim 1, wherein in step d), a target speed is output at which the second vehicle currently has to be driven in order to pass the at least one vehicle driving ahead.

6. The method as recited in claim 1, wherein in step b), the ascertainment of the traffic situation includes ascertaining of the traffic situation in an oncoming traffic lane the ascertaining of the traffic situation in the oncoming traffic lane is at least partially carried out by the first vehicle and include ascertaining, by the first vehicle, a traffic situation in front of the first vehicle in the oncoming lane, the oncoming traffic lane being a different lane than the first lane, the second vehicle receiving, via the wireless communication network, data regarding the traffic situation in the oncoming traffic lane, transmitted from the first vehicle.

7. The method as recited in claim 6, wherein the data regarding the traffic situation in the oncoming traffic lane are transmitted from the first vehicle one of: (i) wirelessly directly to the second vehicle, or (ii) wirelessly to the second vehicle with the aid of an infrastructure device.

8. The method as recited in claim 1, wherein in step b), data from a digital map are used for ascertaining the traffic situation.

9. The method as recited in claim 1, wherein data pertaining to the traffic situation ascertained in step b), and/or the received length of the first vehicle received in step a) is output in the second vehicle in at least one of an optical and acoustic manner.

10. The method as recited in claim 1, wherein data pertaining to the traffic situation are made available to an assistance system of the second vehicle.

11. A device for ascertaining data of a traffic situation using a first vehicle and at least one second vehicle trailing the first vehicle, the device comprising:
- a wireless communication receiver, situated in a second vehicle, including an antenna configured to wirelessly receive, from a first vehicle by the second vehicle, a length of the first vehicle, the first vehicle and the second vehicle traveling in a first traffic lane, and the second vehicle trailing the first vehicle in the first traffic lane;
- a sensor, situated in the second vehicle, configured to ascertain a traffic situation in an oncoming lane;
- a processor, situated in the second vehicle, configured to evaluate the received length of the first vehicle wireless received from the first vehicle and the traffic situation ascertained by the sensor, the evaluation by the processor including the processor determining, using the received length and the ascertained traffic situation, a minimum passing speed for the second vehicle to pass the first vehicle; and
- a display configured to output, in the second vehicle, the determined minimum passing speed.

12. A non-transitory computer-readable data carrier on which is stored a computer program product having program code for ascertaining data of a traffic situation using a first vehicle and at least one second vehicle trailing the first vehicle, the computer program, when executed by an processing device, causing the processing device to perform:
- a) receiving, from a first vehicle traveling in a first traffic lane, via a wireless communication network, by a second vehicle, a length of the first vehicle, the second vehicle traveling in the first traffic lane and trailing the first vehicle in the first traffic lane;
- b) ascertaining a traffic situation in front of the first vehicle by the first vehicle and/or the second vehicle;
- c) evaluating, by the second vehicle, the received length of the first vehicle received in step a) and the ascertained traffic situation ascertained in step b), the evaluating including determining, using the received length and the ascertained traffic situation, a minimum passing speed for the second vehicle to pass the first vehicle; and
- d) providing the determined minimum passing speed determined in step c) to the second vehicle at least at the start of a passing maneuver of the first vehicle conducted by the second vehicle.

13. A method for ascertaining data of a traffic situation using a first vehicle and at least one second vehicle trailing the first vehicle, the method comprising:
- a) ascertaining at least one defined parameter of a first vehicle;
- b) receiving, from the first vehicle traveling in a first traffic lane, via a wireless communication network, by a second vehicle traveling in the first traffic lane and trailing the first vehicle in the first traffic lane, data regarding a traffic situation in front of the first vehicle, the second vehicle trailing the first vehicle in a first traffic lane;
- c) evaluating, by the second vehicle, the ascertained at least one defined parameter and the received data regarding the traffic situation in front of the first vehicle, the evaluating including determining, using the ascertained at least one defined parameter and the received data regarding the traffic situation in front of the first vehicle, a minimum passing speed for the second vehicle to pass the first vehicle; and
- d) providing the determined minimum passing speed determined in step c) to the second vehicle at least at the start of a passing maneuver of the first vehicle conducted by the second vehicle.

14. The method as recited in claim 13, wherein in step a), the at least one defined parameter of the first vehicle is a length of the first vehicle.

15. The method as recited in claim 13, wherein the determined minimum passing speed is output in the second vehicle in an optical manner and/or acoustic manner.

16. The method as recited in claim 13, wherein the data regarding the traffic situation in front of the first vehicle is data related to traffic in an on-coming lane, different from the first traffic lane.

17. The method as recited in claim 16, wherein the data related to the traffic in the on-coming lane, different from the first traffic lane, include a distance of an on-coming vehicle in the on-coming lane, and a speed of the on-coming vehicle.

18. The method as recited in claim 17, wherein in step a), the at least one defined parameter of the first vehicle is a length of the first vehicle, and the ascertaining include receiving, from the first vehicle by the second vehicle, via the wireless communication network, the length of the first vehicle.

* * * * *